(12) United States Patent
Bian (10) Patent No.: US 9,831,805 B2
(45) Date of Patent: Nov. 28, 2017

(54) METHOD FOR ACQUIRING CONSTANT TORQUE OF ELECTRONICALLY COMMUTATED MOTORS

(71) Applicant: Zhongshan Broad-Ocean Motor Co., Ltd., Zhongshan (CN)

(72) Inventor: Wenqing Bian, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 15/353,715

(22) Filed: Nov. 16, 2016

(65) Prior Publication Data
US 2017/0063262 A1    Mar. 2, 2017

(30) Foreign Application Priority Data
Feb. 12, 2015  (CN) .......................... 2015 1 0079416

(51) Int. Cl.
| H02P 7/00 | (2016.01) |
| H02P 23/12 | (2006.01) |
| H02P 6/08 | (2016.01) |
| H02P 6/16 | (2016.01) |
| H02P 23/00 | (2016.01) |
| H02P 27/08 | (2006.01) |
| H02P 6/15 | (2016.01) |

(52) U.S. Cl.
CPC ................ *H02P 6/08* (2013.01); *H02P 6/085* (2013.01); *H02P 6/15* (2016.02); *H02P 6/16* (2013.01); *H02P 23/0077* (2013.01); *H02P 27/08* (2013.01); *H02P 6/153* (2016.02)

(58) Field of Classification Search
None
See application file for complete search history.

(56) References Cited

U.S. PATENT DOCUMENTS

2010/0237814 A1*  9/2010  Bi ............................. H02P 6/16
                                                                318/400.14

* cited by examiner

*Primary Examiner* — Bentsu Ro
*Assistant Examiner* — Zemenay Truneh
(74) *Attorney, Agent, or Firm* — Matthias Scholl, PC; Matthias Scholl (57) ABSTRACT

A method for acquiring a constant torque of an ECM, the method including: A) acquiring a target torque value T0 input from external; B) when the motor is in a non-use state, operating the motor and acquiring an initial rotational speed rpm by the microprocessor; and when the motor is in an operating state, acquiring a current rotational speed rpm by the microprocessor; C) calculating a corresponding target bus current value Itad by the microprocessor using the function of a DC bus current Itad=F(T, rpm) according to the target torque T0 and acquired rotational speed rpm, in which T represents a torque value output by the motor; and D) comparing the target bus current Itad with a real-time bus current Ibus by the microprocessor in a closed-loop control according to the detected real-time bus current Ibus.

10 Claims, 9 Drawing Sheets

METHOD FOR ACQUIRING CONSTANT TORQUE OF ELECTRONICALLY COMMUTATED MOTORS

CROSS-REFERENCE TO RELATED APPLICATIONS

This application is a continuation-in-part of International Patent Application No. PCT/CN2015/090544 with an international filing date of Sep. 24, 2015, designating the United States, now pending, and further claims priority benefits to Chinese Patent Application No. 201510079416.1 filed Feb. 12, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a method for acquiring a constant torque of an ECM.

Description of the Related Art

Typically, the constant torque control mode of electronically commutated motors (ECM) is a vector control mode. However, the vector control mode involves complex mathematical model, troublesome arithmetic, and poses high requirements for the arithmetic capability of the CPU. This leads to high costs. In addition, the control mode also involves a plurality of variables and thus results in poor control accuracy.

SUMMARY OF THE INVENTION

In view of the above-described problems, it is one objective of the invention to provide a method for acquiring a constant torque of an ECM that has simple mathematical model, simplified algorithm, low demand on the arithmetic capability on CPU, low production cost, and relatively high control accuracy.

To achieve the above objective, in accordance with one embodiment of the invention, there is provided a method for acquiring a constant torque of an ECM. The ECM comprises: a stator assembly, a rotor assembly, a housing assembly, and a motor controller. The motor controller comprises: a microprocessor, an inverter circuit, and an operation parameter detecting circuit. The operation parameter detecting circuit inputs operation parameters of the motor to the microprocessor. The microprocessor outputs a pulse width modulation (PWM) signal having a certain duty ratio to control the inverter circuit. The inverter circuit controls operation of coil winding in each phase of the stator assembly. The method comprises:

A) acquiring a target torque value T0 input from external;

B) when the motor is in a non-use state, operating the motor and acquiring an initial rotational speed rpm by the microprocessor; and when the motor is in an operating state, acquiring a current rotational speed rpm by the microprocessor;

C) calculating a corresponding target bus current value Itad by the microprocessor using a function of a DC bus current Itad=F(T, rpm) according to the target torque T0 and acquired rotational speed rpm, in which T represents a torque value output by the motor; and D) comparing the target bus current Itad with a real-time bus current Ibus by the microprocessor in a closed-loop control according to the detected real-time bus current Ibus; when the target bus current value Itad is larger than the real-time bus current Ibus, increasing a duty ratio of the PWM signal output by the microprocessor; when the target bus current value Itad is smaller than the real-time bus current Ibus, reducing the duty ratio of the PWM signal; and when the target bus current value Itad is equal to the real-time bus current Ibus, stopping regulating the PWM signal, allowing the ECM to enter a working state, and repeating B) for continuing a control state of the constant torque.

In a class of this embodiment, that the target bus current Itad is equal to the real-time bus current Ibus means that an error of a deviation of the real-time bus current Ibus from the target bus current Itad is within a range of 1%.

In a class of this embodiment, the function in C) is Itad=C×(rpm+A)/B, in which, C represents a constant, A=$f1$(T), and B=$f2$(T), that is, both A and B are functions for setting torque values T In a class of this embodiment, both A and B are first order functions for setting torque values T.

In a class of this embodiment, the function Itad=C×(rpm+A)/B is an equation for bus current under a control mode of the constant torque established by experiment means and is stored in the microprocessor.

In a class of this embodiment, A=K0 +K1*T, in which, K0 and K1 are constants acquired from measurements, and T represents a torque output by the motor. B=D0+K0 +K1 *T, in which, D0 represents a constant, and T represents the torque output by the motor.

Advantages of the method for acquiring the constant torque of the ECM according to embodiments of the invention are summarized as follows:

1) The function of bus current Itad=C×(rpm+A)/B under the control mode of the constant torque is established by experiment means, in which, both A and B are first order functions for setting torque values T The mathematical model is simple. The microprocessor calculates a corresponding target bus current value Itad using the function of the DC bus current Itad=F(T, rpm) according to the target torque T0 and the rotational speed rpm, in which T represents the torque value output by the motor, and compares the target bus current Itad with the real-time bus current Ibus for the closed-loop control according to the detected real-time bus current Ibus. When the target bus current value Itad is larger than the real-time bus current Ibus, the duty ratio of the PWM signal output by the microprocessor is increased. When the target bus current value Itad is smaller than the real-time bus current Ibus, the duty ratio of the PWM signal output by the microprocessor is reduced. When the target bus current value Itad is equal to the real-time bus current Ibus, the regulation of the PWM signal output by the microprocessor is stopped. The number of the controlled variables is small, and the mathematical model is simple. The microprocessor, such as CPU or MCU, whose arithmetic capability is not high, can be employed so as to greatly reduce the production cost. In the meanwhile, the closed-loop control and the full measurements of the experiment means effectively ensure the control accuracy. 2) In the experiment, as long as the DC bus current and the rotational speed data corresponding to three torque points are measured, the equation for calculating the bus current Itad=C× (rpm+A)/B under the control mode of the constant torque can be acquired, thus being convenient and simple and having relatively high accuracy.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for acquiring a constant torque of an ECM are described below. It should be noted that the following examples are intended to describe and not to limit the invention.

Figure 1:
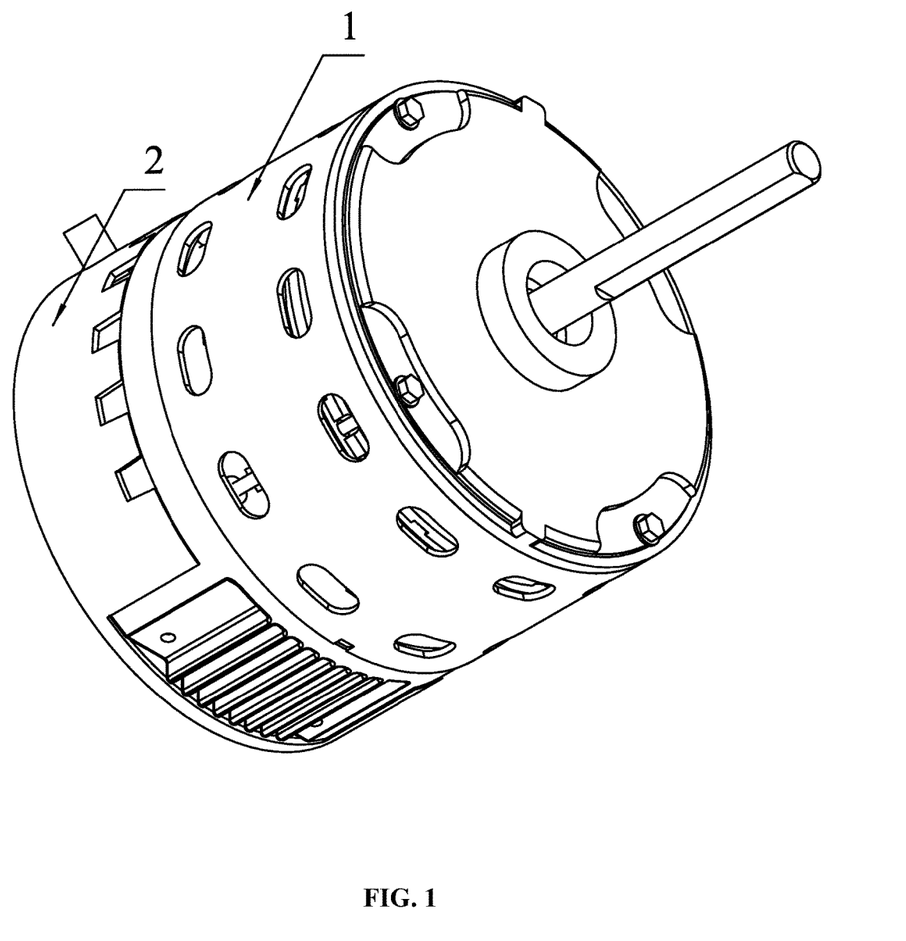
FIG. 1 is a stereogram of an ECM in accordance with one embodiment of the invention.
Figure 2:
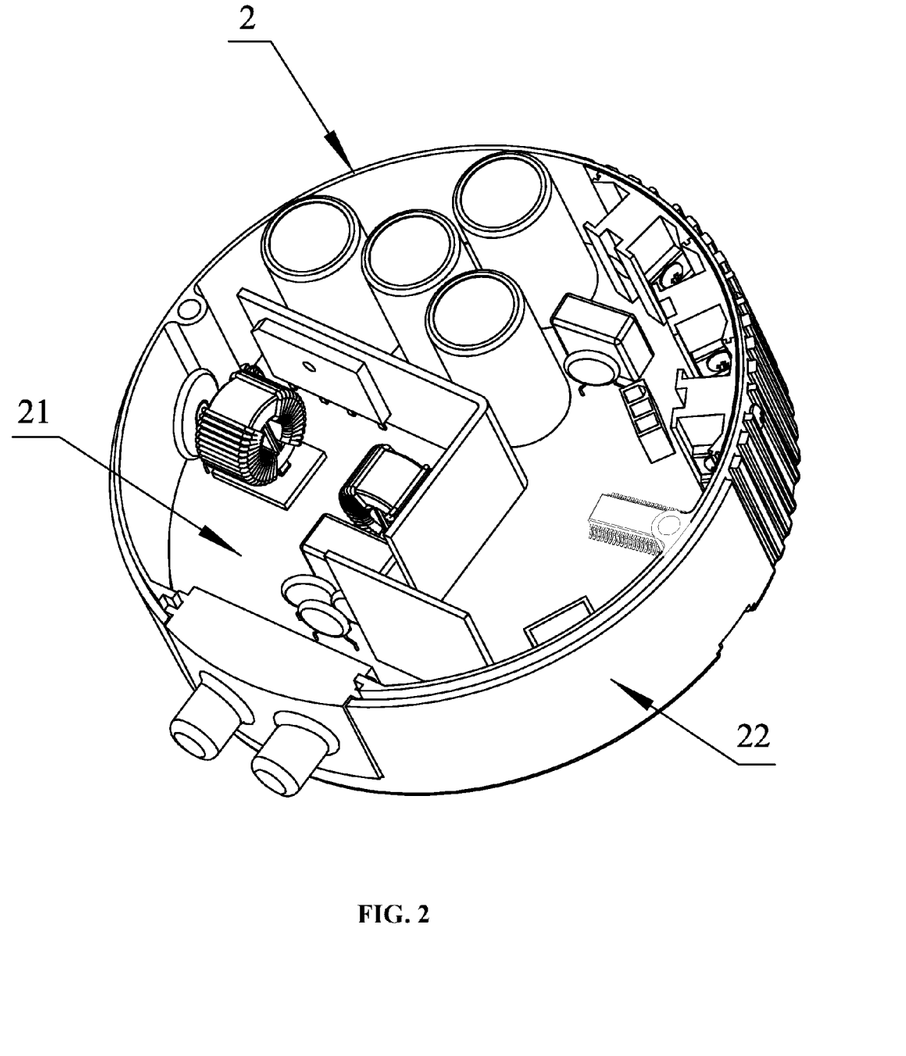
FIG. 2 is a stereogram of a motor controller of an ECM in accordance with one embodiment of the invention.
Figure 3:
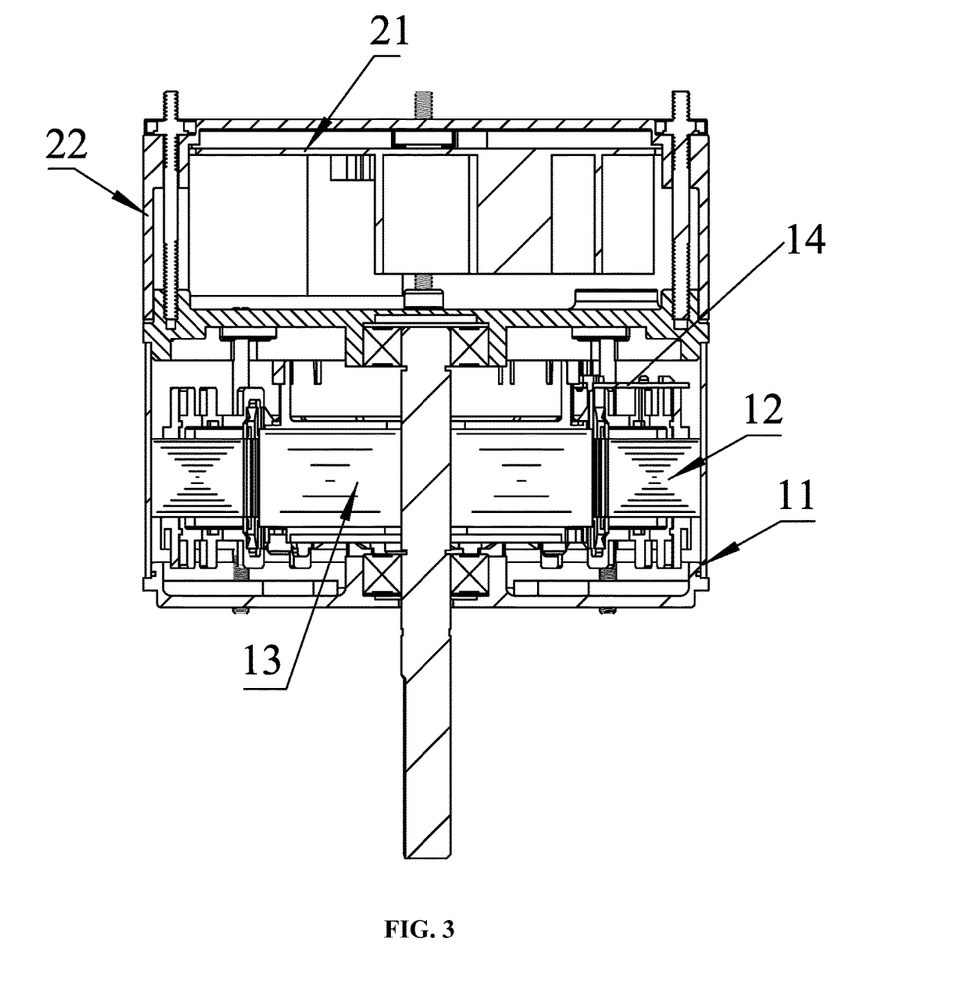
FIG. 3 is a cross sectional view of an ECM in accordance with one embodiment of the invention.

As shown in FIGS. 1-3, an ECM generally comprises a motor controller 2 and a motor body 1. The motor body 1 comprises: a stator assembly 12, a rotor assembly 13, and a housing assembly 11. The stator assembly 13 is installed on the housing assembly 11. A Hall sensor 14 is installed on the motor body 1 for detecting a rotor position. The rotor assembly 13 is nested inside or outside the stator assembly 12. The motor controller 2 comprises a control box 22 and a control circuit board 21 installed inside the control box 22. The control circuit board 21 generally comprises: a power supply circuit, a microprocessor, a bus current detecting circuit, an inverter circuit, and a rotor position measuring circuit 14 (i.e., the Hall sensor). A power supply circuit supplies power to other parts of circuits. The rotor position measuring circuit detects a rotor position signal and inputs the rotor position signal to the microprocessor. The bus current detecting circuit inputs a detected bus current into the microprocessor. The microprocessor controls the inverter circuit, and the inverter circuit controls a power on or a power off state of each phase of coil winding of the stator assembly 12. The bus current detecting circuit and the rotor position measuring circuit 14 are components forming the operation parameter detecting circuit. The microprocessor calculates an actual rotational speed rpm based on measured data by the rotor position measuring circuit 14. The rotational speed rpm is optionally calculated by measuring a phase current of the coil winding of the motor, which is specifically illustrated in the vector control of the motor in a textbook and therefore no need for specific introduction herein.

Figure 4:
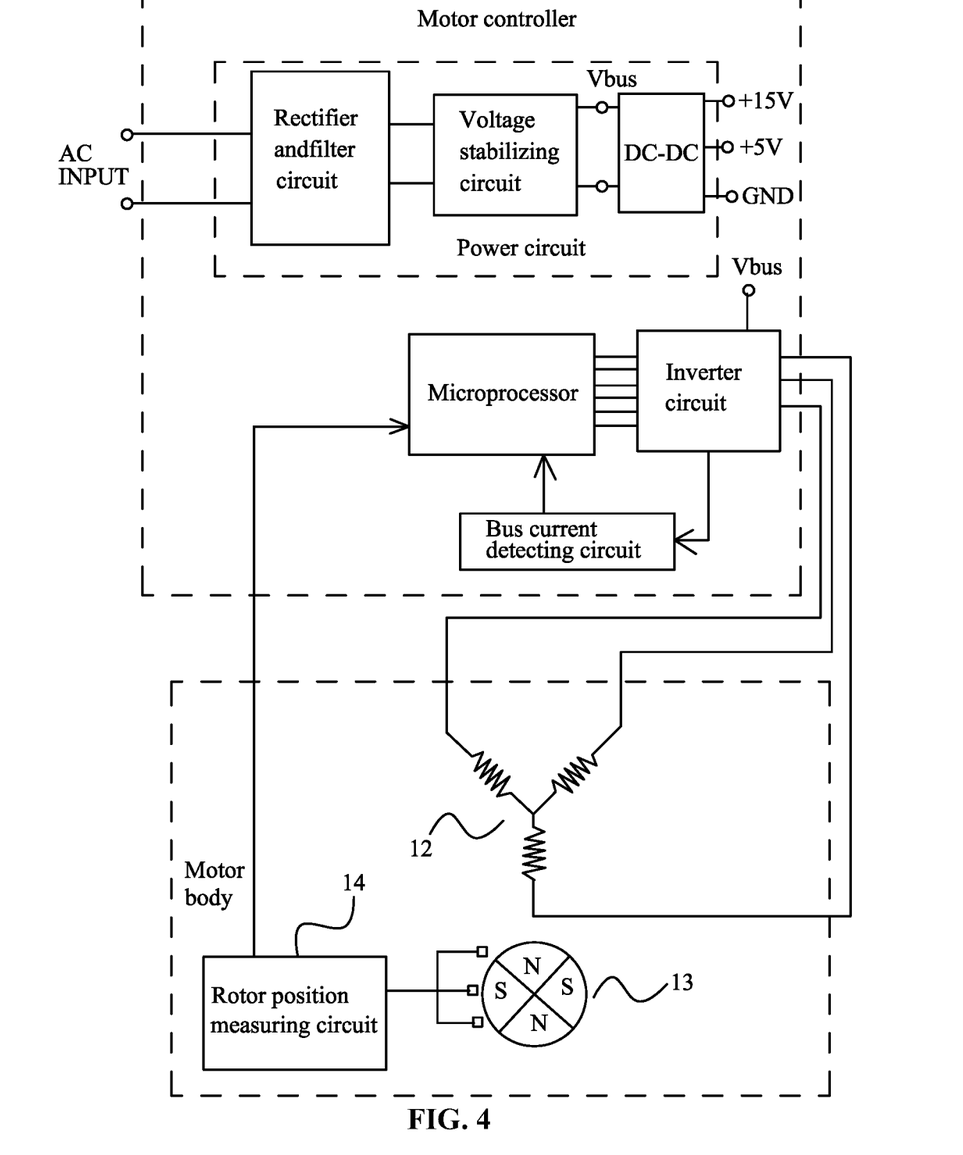
FIG. 4 is a circuit block diagram of a motor controller of an ECM in accordance with one embodiment of the invention.
Figure 5:
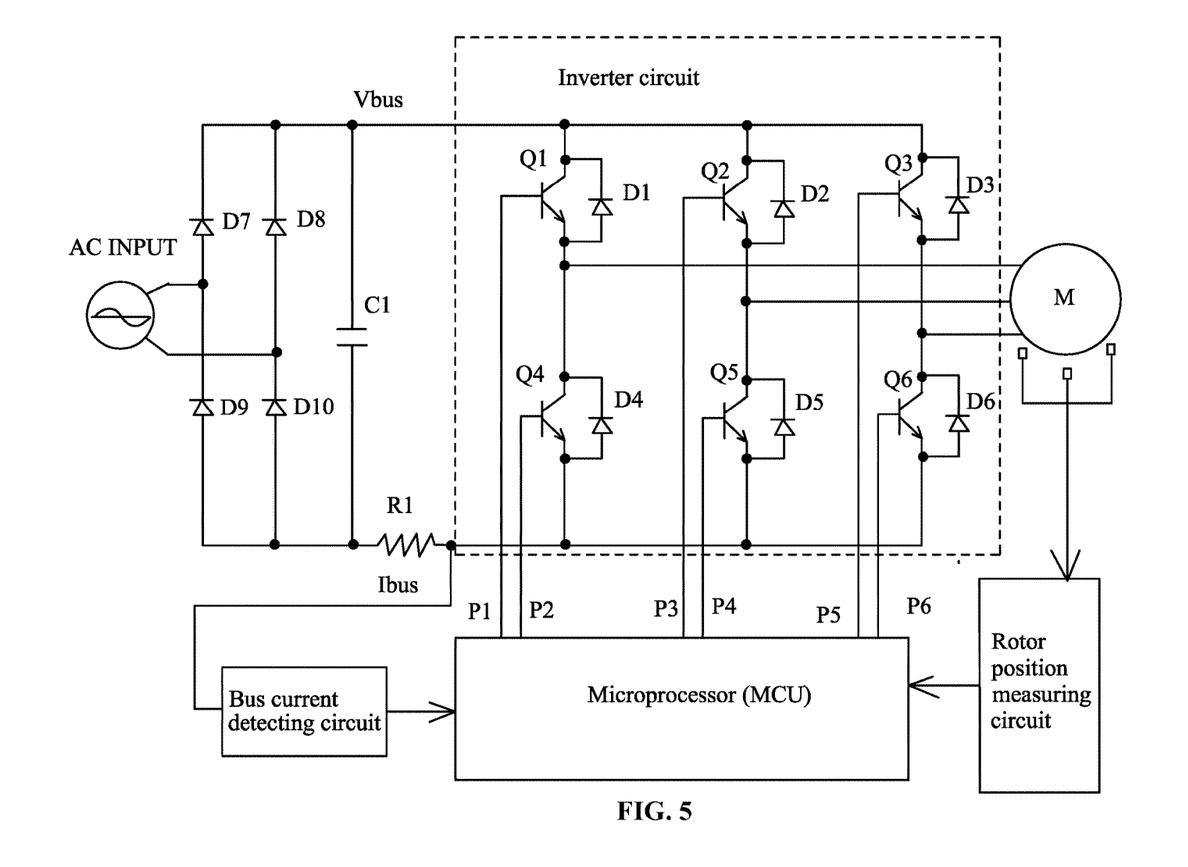
FIG. 5 is a circuit diagram corresponding to FIG. 4.

As shown in FIGS. 4-5, assuming that the ECM is a three-phase brushless DC permanent magnetic synchronous motor, the rotor position measuring circuit 14 generally adopts three Hall sensors. Each of the three Hall sensors respectively detects a rotor position in a 360° electric angle cycle, and the energization state of each phase of the coil winding of the stator assembly changes when the electric angle changes for every 120° electric angle, thus forming a three-phase six-step control mode. An AC input passes a full wave commutate circuit formed by diodes D7, D8, D9, and D10 and outputs a DC bus voltage Vbus at a terminal of a capacitance C1. The DC bus voltage Vbus is related to an input AC voltage, and when a voltage of the AC input is determined, the bus voltage Vbus is constant, and a line voltage Vm of the three-phase winding is a PWM chopped output voltage, Vm=Vbus*w, in which, w represents a duty ratio of the PWM signal input into the inverter circuit by the microprocessor. The DC bus current Ibus can be changed by changing the line voltage P. The inverter circuit is formed by electronic switching tubes Q1, Q2, Q3, Q4, Q5, and Q6, and control terminals of the electronic switching tubes Q1, Q2, Q3, Q4, Q5, and Q6 are controlled by six paths of PWM signals (P1, P2, P3, P4, P5, and P6) output by the microprocessor. The inverter circuit is further connected to a resistance R1 for detecting the bus current Ibus, and the bus current Ibus detected by the resistance R1 is converted by the bus current detecting circuit and transmitted to the microprocessor.

Figure 7:
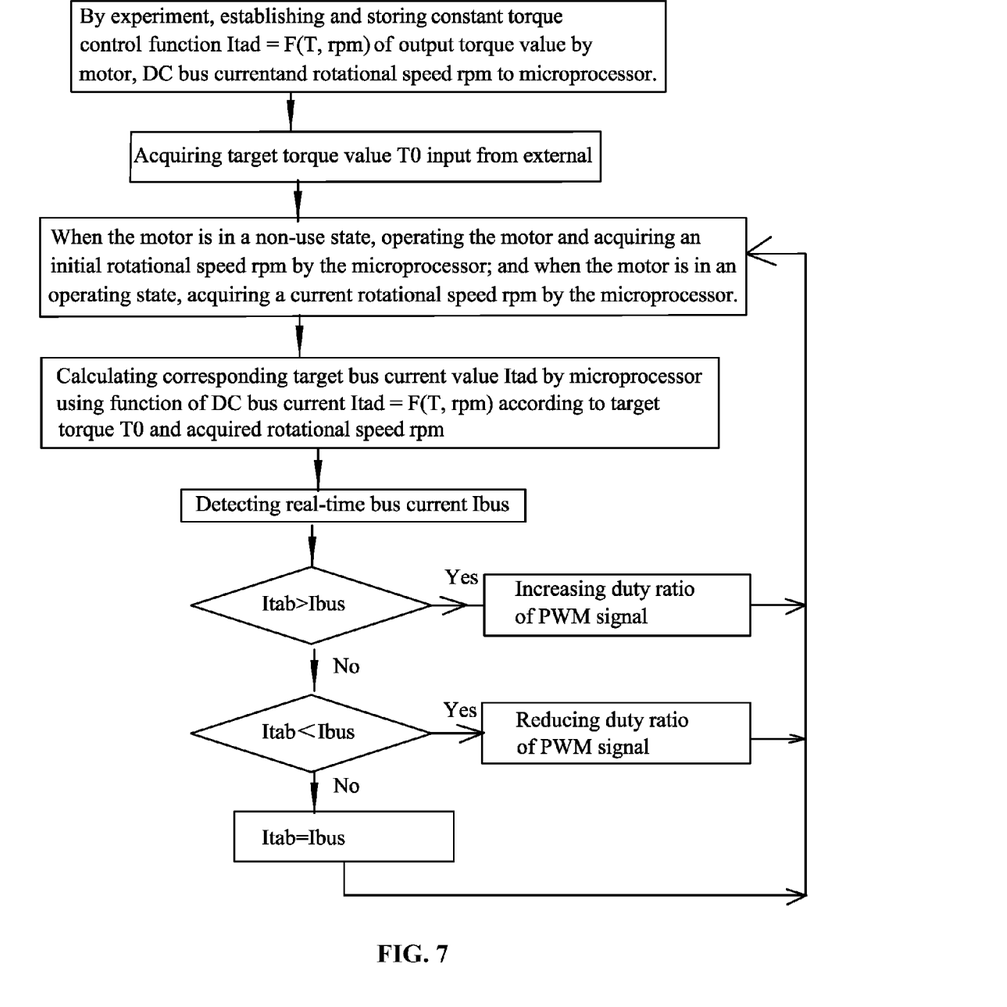
FIG. 7 is a control flow chart illustrating a method for acquiring a constant torque in accordance with one embodiment of the invention.

As shown in FIG. 7, a method for acquiring a constant torque of an ECM is illustrated. The ECM comprises: a stator assembly, a rotor assembly, a housing assembly, and a motor controller. The motor controller comprises: a microprocessor, an inverter circuit, an operation parameter detecting circuit. The operation parameter detecting circuit inputs operation parameters of the motor to the microprocessor. The microprocessor outputs a PWM signal having a certain duty ratio to control the inverter circuit. The inverter circuit controls operation of coil winding in each phase of the stator assembly. The method comprises the following steps:

A) acquiring a target torque value T0 input from external;

B) when the motor is in a non-use state, operating the motor and acquiring an initial rotational speed rpm by the microprocessor; and when the motor is in an operating state, acquiring a current rotational speed rpm by the microprocessor;

C) calculating a corresponding target bus current value Itad by the microprocessor using a function of a DC bus current Itad=F(T, rpm) according to the target torque T0 and acquired rotational speed rpm, in which T represents a torque value output by the motor;

D) comparing the target bus current Itad with a real-time bus current Ibus by the microprocessor in a closed-loop control according to the detected real-time bus current Ibus; when the target bus current value Itad is larger than the real-time bus current Ibus, increasing a duty ratio of the PWM signal output by the microprocessor; when the target bus current value Itad is smaller than the real-time bus current Ibus, reducing the duty ratio of the PWM signal output by the microprocessor; and when the target bus current value Itad is equal to the real-time bus current Ibus, stopping regulating the PWM signal output by the microprocessor, allowing the ECM to enter a working state, and repeating B) for continuing a control state of the constant torque.

That the target bus current Itad is equal to the real-time bus current Ibus means that an error of a deviation of the real-time bus current Ibus from the target bus current Itad is within a range of 1%.

The function in C) is $Itad=C\times(rpm+A)/B$, in which, C represents a constant, $A=f1(T)$, and $B=f2(T)$, that is, both A and B are functions for setting torque values T Both A and B are first order functions for setting torque values T.

The function $Itad=C\times(rpm+A)/B$ is an equation for bus current under a control mode of the constant torque established by experiment measures and is stored in the microprocessor.

$A=K0+K1*T$, in which, K0 and K1 are constants acquired from measurements, and T represents output torque of the motor. $B=D0+K0+K1*T$, in which, D0 represents a constant, and T represents an output torque of the motor.

Figure 6:
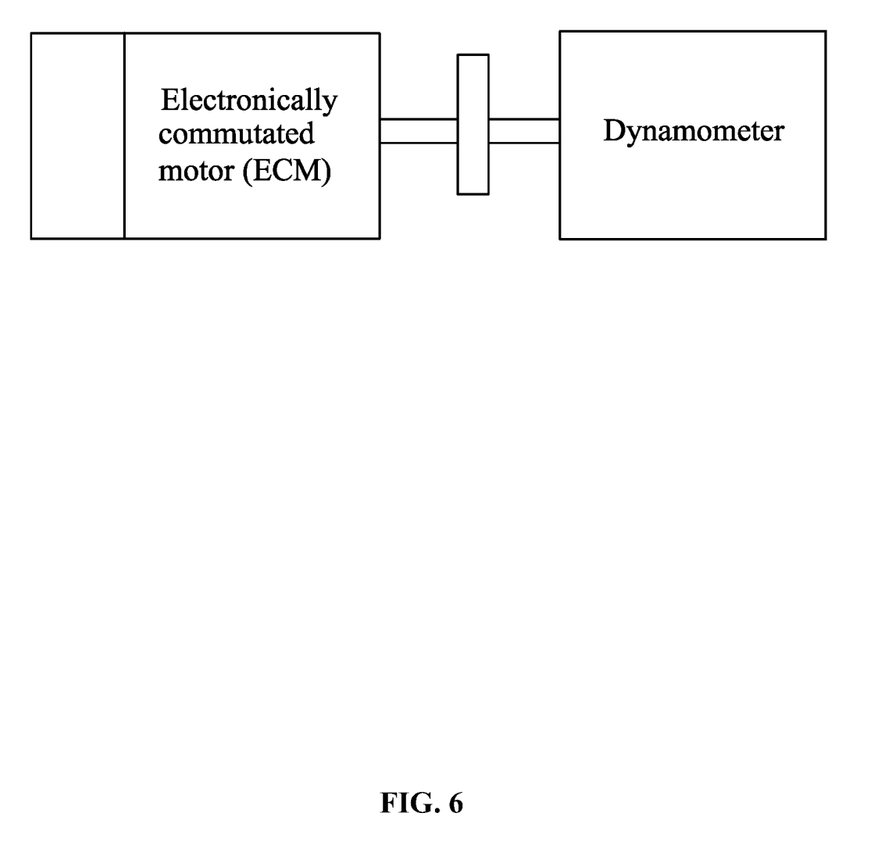
FIG. 6 is a diagram showing connection between an ECM and a dynamometer.

As shown in FIG. 6, an ECM having a range of rotational speed of different gears of between 325 rpm and 1400 rpm and a maximum torque of 30 N·m is adopted for experiment. In an open-loop, the direct bus current corresponding to different rotational speed and different torque of the ECM is measured by a dynamometer. In the experiment, only rotational speed of two gears (325 rpm and 825 rpm) and torque values of three fixed points are selected, specifically, the three torque values of fixed point under the rotational speed of 325 rpm, and three torque values of fixed point under the rotational speed of 825 rpm. The test results are listed in Table 1.

TABLE 1

DC bus current Itad in conditions of different rotational speeds and different torques

| Testing points | Torque value (N · m) | Rotational speed value (rpm) | Detected DC bus current Itad (Ampere) output by a controller |
|---|---|---|---|
| 1 | T1 = 30 | rpm1 = 825 | Itad1 = 3.5 |
| 2 | T2 = 20 | rpm1 = 825 | Itad2 = 2.6 |
| 3 | T3 = 10 | rpm1 = 825 | Itad3 = 1.8 |
| 4 | T1 = 30 | rpm2 = 325 | Itad4 = 2.75 |
| 5 | T2 = 20 | rpm2 = 325 | Itad5 = 20 |
| 6 | T3 = 10 | rpm2 = 325 | Itad6 = 14.8 |

Figure 8:
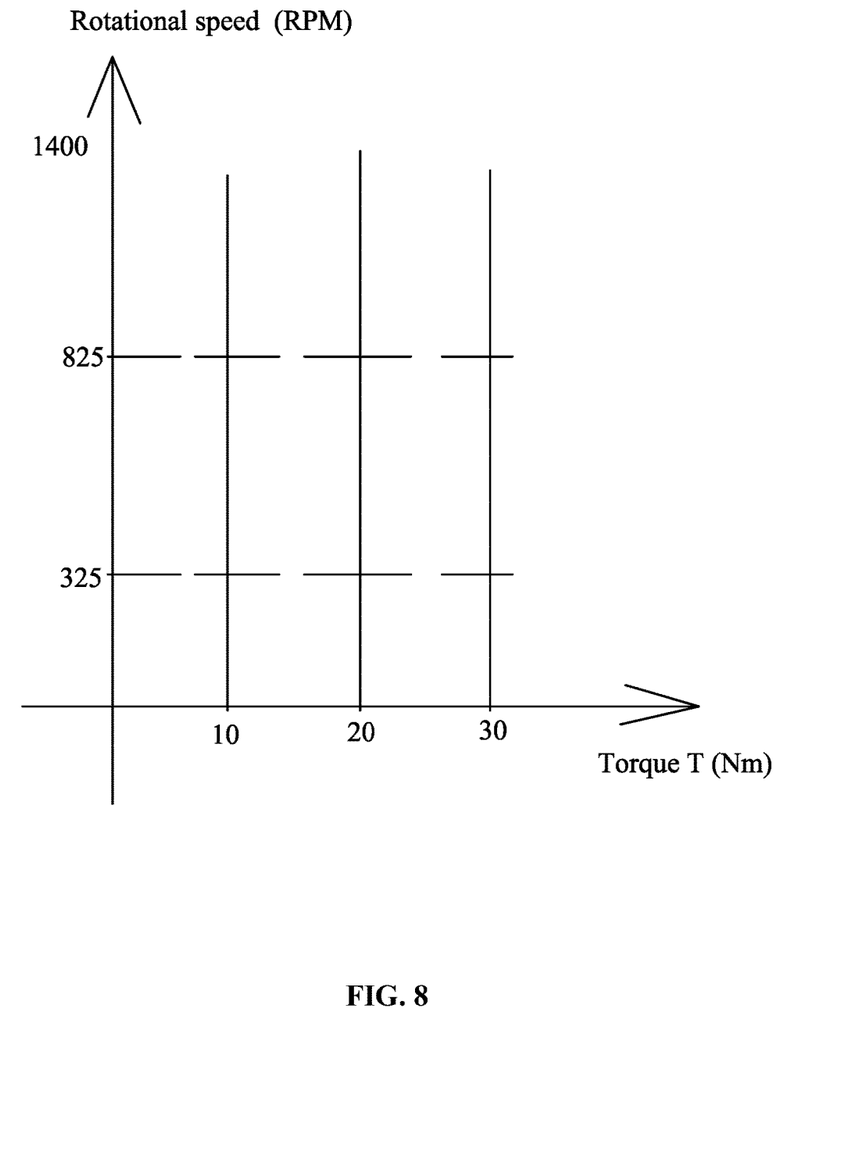
FIG. 8 is a curve chart illustrating a relation between a rotational speed of an ECM and a preset torque in accordance with one embodiment of the invention.
Figure 9:
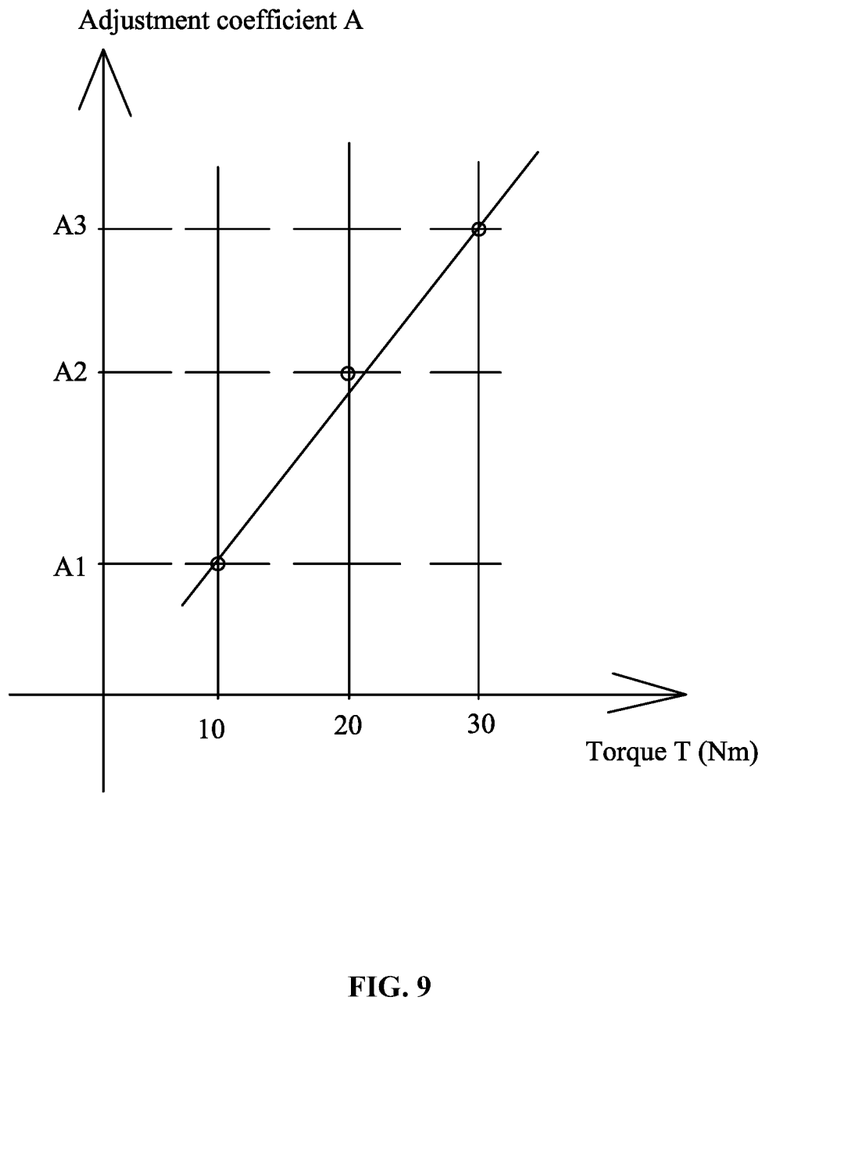
FIG. 9 is a curve chart illustrating a relation between an adjustment coefficient and a preset torque in accordance with one embodiment of the invention.

As shown in FIGS. 8 and 9, because under the control mode of the constant torque, the torque does not change in conditions of different rotational speeds, and only the DC bus current is different. Thus, the torque is positively proportional to the current and negatively proportional to the rotational speed. An adjustment coefficient A is then introduced, and it can be defined that the torque $T=Kn\times Itad/(rpm+A)$, in which Kn is the coefficient. Three equations are obtained based on combinations of testing points 1 and 4, 2 and 5, and 3 and 6.

$$Itad1/(rpm1+A1)=Itad4/(rpm2+A1) \quad (1)$$

$$Itad2/(rpm1+A2)=Itad5/(rpm2+A2) \quad (2)$$

$$Itad3/(rpm1+A3)=Itad6/(rpm2+A3) \quad (3)$$

Itad1, Itad2, Itad3, Itad4, Itad5, Itad6, rpm1, and rpm2 in Table 1 are put into the three equations to calculate the adjustment coefficient A1 at the constant torque of T1=30, the adjustment coefficient A2 at the constant torque of T2=20, and the adjustment coefficient A3 at the constant torque of T3=10. As shown in FIG. 9, a coordinate involving the coefficient and the torque is established, and a curve relationship between the adjustment coefficient A and the torque T is imitated by line drawing. The more dots are positioned, the more accurate the curve relationship is. The curve can be described by the function $A=K0+K1*T+K2*T2+K3*T3$. But in practice, it is assumed that the adjustment coefficient A and the torque T are in linear relation (thus, it only requires to test three torque points), that is, $A=K0+K1*T$, in which, K0 is equivalent to a minimum torque output by the motor, K1 represents a slop of the straight line, then, $A=f1(T)$, i.e., A is a function involving the torque T The current value $Itad1(rpm+A)=Itad4/(rpm2+A)$ corresponding to any rotational speed under the constant torque mode can be deduced according to the definition equation (1), in which, the rpm2 is 825 rpm according to the experiment data, Itad4 is known, thus, $Itad=(Itad4/(rpm2+A))\times(rpm+A)$. It is defined that $B=D0+A$, $D0=rpm2$ which is a constant. As A is the function involving the torque T, B is also the function involving torque T, and $B=f2(T)$. Let the coefficient $C=Itad4$, the equation for calculating the bus current of the control function of the constant torque is $Itad=C\times(rpm+A)/B$.

The control of the constant torque can be conducted by encoding a program into the microprocessor. When the motor is in the non-use state, the motor is operated and the initial rotational speed rpm is acquired by the microprocessor. When the motor is in the operating state, the current rotational speed rpm is acquired by the microprocessor. A corresponding target bus current value Itad is calculated by the microprocessor using the function of the DC bus current $Itad=F(T, rpm)$ according to the target torque T0 and the rotational speed rpm, in which T represents the torque value output by the motor. The target bus current Itad is compared with the real-time bus current Ibus by the microprocessor for the closed-loop control according to the detected real-time bus current Ibus. When the target bus current value Itad is larger than the real-time bus current Ibus, the duty ratio of the PWM signal output by the microprocessor is increased. When the target bus current value Itad is smaller than the real-time bus current Ibus, the duty ratio of the PWM signal output by the microprocessor is reduced. When the target bus current value Itad is equal to the real-time bus current Ibus, the regulation of the PWM signal output by the microprocessor is stopped.

Under the open loop mode, the DC bus current corresponding to different rotational speeds and different torques of the ECM is tested by the dynamometer to form N groups of test data. The more the data of different torque points are tested, i.e., the more the testing points are, the higher the accuracy of the obtained function $Itad=C\times(rpm+A)/B$ is. It requires to select the number and the range of the testing points according to the control accuracy.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for acquiring a constant torque of an electronically commutated motor, the electronically commutated motor comprising:
   a) a stator assembly,
   b) a rotor assembly,
   c) a housing assembly, and
   d) a motor controller, the motor controller comprising: a microprocessor, an inverter circuit, and an operation parameter detecting circuit;
   the operation parameter detecting circuit being configured to input operation parameters of the motor to the microprocessor; the microprocessor operating to output a pulse width modulation signal having a certain duty ratio to control the inverter circuit; and the inverter circuit operating to control operation of coil winding in each phase of the stator assembly;

the method comprising:

A) acquiring a target torque value TO input from external;

B) when the motor is in a non-use state, operating the motor and acquiring an initial rotational speed rpm by the microprocessor; and when the motor is in an operating state, acquiring a current rotational speed rpm by the microprocessor;

C) calculating a corresponding target bus current value Itad by the microprocessor using a function of a DC bus current Itad=F(T, rpm) according to the target torque TO and acquired rotational speed rpm, in which T represents a torque value output by the motor; and D) comparing the target bus current Itad with a real-time bus current Ibus by the microprocessor in a closed-loop control according to the detected real-time bus current Ibus; when the target bus current value Itad is larger than the real-time bus current Ibus, increasing a duty ratio of the pulse width modulation signal output by the microprocessor; when the target bus current value Itad is smaller than the real-time bus current Ibus, reducing the duty ratio of the pulse width modulation signal; and when the target bus current value Itad is equal to the real-time bus current Ibus, stopping regulating the pulse width modulation signal, allowing the electronically commutated motor to enter a working state, and repeating B) for continuing a control state of the constant torque.

2. The method of claim 1, wherein that the target bus current Itad is equal to the real-time bus current Ibus means that an error of a deviation of the real-time bus current Ibus from the target bus current Itad is within a range of 1%.

3. The method of claim 2, wherein the function in C) is Itad=C×(rpm+A)/B, in which, C represents a constant, A=$f1$(T), and B=$f2$(T), and both A and B are functions for setting torque values T.

4. The method of claim 3, wherein both A and B are first order functions for setting torque values T.

5. The method of claim 3, wherein the function Itad=C×(rpm 30 A)/B is an equation for bus current under a control mode of the constant torque established by experiment means and is stored in the microprocessor.

6. The method of claim 1, wherein the function in C) is Itad=C×(rpm+A)/B, in which, C represents a constant, A=$f1$(T), and B=$f2$(T), and both A and B are functions for setting torque values T.

7. The method of claim 6, wherein both A and B are first order functions for setting torque values T.

8. The method of claim 6, wherein the function Itad=C×(rpm +A)/B is an equation for bus current under a control mode of the constant torque established by experiment means and is stored in the microprocessor.

9. The method of claim 6, wherein

A=K0+K1*T, in which, K0 and K1 are constants acquired from measurements, and T represents a torque output by the motor; and B=D0+K0+K1*T, in which, D0 represents a constant, and T represents the torque output by the motor.

10. The method of claim 6, wherein

A=K0+K1*T, in which, K0 and K1 are constants acquired from measurements, and T represents a torque output by the motor; and B=D0+K0+K1*T, in which, D0 represents a constant, and T represents the torque output by the motor.

* * * * *